(12) United States Patent
Okubo et al.

(10) Patent No.: US 8,487,042 B2
(45) Date of Patent: Jul. 16, 2013

(54) POLYARYLENE SULFIDE RESIN COMPOSITION AND A MOLDED ARTICLE FORMED THEREFROM

(75) Inventors: Naoto Okubo, Ichihara (JP); Wataru Kosaka, Ichihara (JP); Eiji Tamura, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 181 days.

(21) Appl. No.: 12/597,996

(22) PCT Filed: May 2, 2008

(86) PCT No.: PCT/JP2008/058406
§ 371 (c)(1),
(2), (4) Date: Oct. 28, 2009

(87) PCT Pub. No.: WO2008/139968
PCT Pub. Date: Nov. 20, 2008

(65) Prior Publication Data
US 2010/0063192 A1 Mar. 11, 2010

(30) Foreign Application Priority Data

May 15, 2007 (JP) .................................. 2007-128979

(51) Int. Cl.
*C08K 3/38* (2006.01)
*C08K 3/40* (2006.01)

(52) U.S. Cl.
USPC ........... 524/701; 524/404; 524/492; 524/493; 524/494; 524/847; 524/912

(58) Field of Classification Search
USPC ................. 524/404, 494, 493, 492, 701, 847, 524/912
See application file for complete search history.

(56) References Cited

U.S. PATENT DOCUMENTS

| | | | |
|---|---|---|---|
| 4,176,098 A | 11/1979 | Needham | |
| 2003/0181560 A1* | 9/2003 | Kawaguchi et al. | 524/424 |
| 2007/0045823 A1* | 3/2007 | Miller | 257/706 |

FOREIGN PATENT DOCUMENTS

| | | |
|---|---|---|
| EP | 246620 A2 * | 11/1987 |
| JP | 53-5252 | 1/1978 |
| JP | 5-21650 | 1/1993 |
| JP | 2003-128915 | 5/2003 |
| JP | 2004-35273 | 2/2004 |
| JP | 2005-146214 | 6/2005 |
| JP | 2005-161693 | 6/2005 |
| JP | 2005-306955 | 11/2005 |
| JP | 2007-106950 | 4/2007 |
| WO | WO 2007/052727 A1 | 5/2007 |

* cited by examiner

*Primary Examiner* — Ling Choi
*Assistant Examiner* — Darcy D Laclair Lynx
(74) *Attorney, Agent, or Firm* — Oblon, Spivak, McClelland, Maier & Neustadt, L.L.P.

(57) ABSTRACT

A resin composition including the following components (A) to (C):
(A) polyarylene sulfide resin: 20 wt %<component (A)≦60 wt %;
(B) hexagonal boron nitride: 8 wt %≦component (B)≦55 wt %; and
(C) flat glass fiber: 15 wt % ≦component (C)≦55 wt % wherein the amount ratio of each component is a weight percentage relative to the total amount of the components (A) to (C).

9 Claims, 1 Drawing Sheet

Oblateness=D2/D1

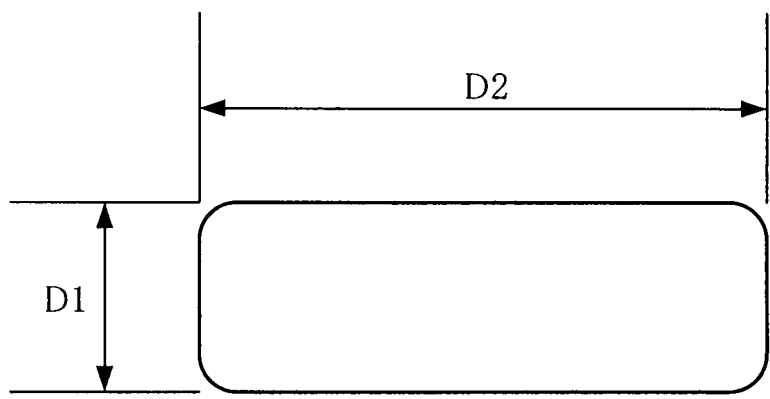
Oblateness=D2/D1

POLYARYLENE SULFIDE RESIN COMPOSITION AND A MOLDED ARTICLE FORMED THEREFROM

This application is a 371 of PCT/JP08/58406, filed May 2, 2008.

TECHNICAL FIELD

The invention relates to a resin composition and a molded article formed therefrom. More particularly, the invention relates to a resin composition which is improved in voltage resistance, electric insulating properties, heat resistance, heat conductivity, fluidity and toughness in a well-balanced manner, and is suitable for use as electric and electronic components, or the like.

BACKGROUND ART

A polyarylene resin-based resin, in particular, a polyphenylene sulfide resin (hereinafter referred to as a "PPS resin") is widely used in electric and electronic components, mechanical components, automobile components or the like since it is improved in heat resistance, chemicals resistance, fire retardancy, rigidity, dimensional stability or the like.

However, as compared with other engineering plastics such as a syndiotactic polystyrene resin (hereinafter referred to as a "SPS resin"), a nylon 66 resin (hereinafter referred to as a "PA66 resin") and a liquid crystal polyester resin (hereinafter referred to as a "LCP resin"), a PPS resin has a drawback that it is poor in voltage resistance. Therefore, in some applications, use of a PPS resin under a high voltage is restricted.

In addition, in recent years, higher value addition, including a reduction in size, has been required for electric and electronic components. Under such circumstances, insulating materials have been required which can withstand the use under electric and temperature environments which are severer than those in the past. In particular, development of an insulating material which is improved in voltage resistance, electric insulating properties, heat resistance, heat conductivity and fluidity in a well-balanced manner has been required.

In response to this requirement, a PPS resin to which a filler having a high degree of insulating properties and/or heat conductivity is added has been proposed. For example, a resin composition using talc (Patent Documents 1 to 3), a resin composition using silica-coated aluminum nitride (Patent Document 4) and a resin composition using silica-coated magnesium oxide (Patent Document 5) have been disclosed.

However, although talc improves anti-track properties and arc resistance, it does not improve voltage resistance sufficiently. Silica-coated aluminum nitride and silica-coated magnesium oxide improve heat conductivity. However, they do not improve voltage resistance.

In addition, in order to sufficiently improve electric insulating properties and/or heat conductivity, a large amount of filler has to be added. Addition of such a large amount of filler encounters a problem that fluidity and toughness are significantly lowered. As a method for recovering toughness which has been once lowered, addition of an elastomer and/or a fibrous filler is widely known. However, this method is not effective for a resin containing a large amount of filler.

Therefore, on a practical level, these resin compositions are not improved in electric insulating properties, heat conductivity, fluidity and toughness in a well-balanced manner. In addition, since no attempt has been made to improve voltage resistance, these resin compositions are not sufficient in voltage resistance.

Patent Document 1: JP-A-S53-5252
Patent Document 2: JP-A-H05-21650
Patent Document 3: JP-A-2003-128915
Patent Document 4: JP-A-2005-146214
Patent Document 5: JP-A-2005-306955

The invention has been made in view of the above-mentioned circumstances, and the object thereof is to provide a resin composition which is improved in voltage resistance, electric insulating properties, heat resistance, heat conductivity, fluidity and toughness in a well-balanced manner.

DISCLOSURE OF THE INVENTION

The inventors made intensive studies to attain the above-mentioned object. As a result, the inventors have found that, by adding hexagonal boron nitride and flat glass fibers to a polyarylene sulfide resin, and by allowing the amount ratio to be a specific ratio, the voltage resistance of the composition is significantly increased, and, as a result, a resin composition improved in electric insulating properties, heat resistance, heat conductivity, fluidity and toughness in a well-balanced manner can be obtained.

The invention has been made based on this finding.

According to the invention, the following resin composition or the like are provided.

1. A resin composition comprising the following components (A) to (C):
   (A) polyarylene sulfide resin: 20 wt %<component (A)≦60 wt %;
   (B) hexagonal boron nitride: 8 wt %≦component (B)≦55 wt %; and
   (C) flat glass fiber: 15 wt %≦component (C)≦55 wt %
   wherein the amount ratio of each component is a weight percentage relative to the total amount of the components (A) to (C).
2. The resin composition according to 1, wherein the polyarylene sulfide resin is a polyphenylene sulfide resin.
3. The resin composition according to 1 or 2, wherein the cross-sectional oblateness of the flat glass fiber is 2 to 20.
4. The resin composition according to any one of 1 to 3, which further comprises the following component (D):
   (D) one or more resin additives selected from the group consisting of a mold release agent, a plasticizer, a fire retardant, an anti-oxidant, an infrared radiation ratio improver and a compatibilizer.
5. The resin composition according to any one of 1 to 4, which has a dielectric breakdown strength of 25 kV/mm or more.
6. The resin composition according to any one of 1 to 5, which has an arc resistance of 180 seconds or more.
7. The resin composition according to any one of 1 to 6, which has a heat conductivity of 2 to 15 W/mK.
8. A molded article which is obtained by injection-molding the resin composition according to any one of 1 to 7.
9. A voltage-proof component comprising the molded article according to 8.

According to the invention, a resin composition which is improved in voltage resistance, electric insulating properties, heat resistance, heat conductivity, fluidity and toughness in a well-balanced manner can be provided.

BRIEF DESCRIPTION OF THE DRAWINGS

FIG. 1 is a view showing a cross-sectional oblateness of a glass fiber used in the invention.

BEST MODE FOR CARRYING OUT THE INVENTION

The resin composition of the invention contains the following components (A) to (C). It is preferred that the resin composition consist essentially of the following components (A) to (C):

(A) polyarylene sulfide resin: 20 wt %<component (A)≦60 wt %

(B) hexagonal boron nitride: 8 wt %≦component (B)≦55 wt %

(C) flat glass fiber: 15 wt % component (C) 55 wt % wherein the amount ratio of each component is a weight percentage relative to the total amount of components (A) to (C).

The amount ratio of the polyarylene sulfide resin (component (A)) relative to the total amount of the components (A) to (C) is larger than 20 wt % and not larger than 60 wt %, preferably 23 to 57 wt %.

If the amount ratio of the component (A) is 20 wt % or less, kneading may be impossible or molding may be difficult due to a lowering in fluidity. On the other hand, if the amount ratio of the component (A) exceeds 60 wt %, voltage resistance and heat conductivity may be insufficient.

The amount ratio of the hexagonal boron nitride (component (B)) relative to the total amount of the components (A) to (C) is 8 to 55 wt %, preferably 8 to 50 wt %, relative to the total amount of the components (A) to (C).

If the amount of the component (B) is less than 8 wt %, the voltage resistance and the electric insulating properties may be insufficient. If the amount ratio of the component (B) exceeds 55 wt %, kneading may be impossible or molding may be difficult due to a lowering in fluidity.

The amount ratio of the flat glass fiber (component (C)) is 15 to 55 wt %, preferably 20 to 45 wt %, relative to the total amount of the components (A) to (C).

If the amount ratio of the component (C) is less than 15 wt %, it may be difficult to use the resulting molded article due to insufficient impact strength. If the amount ratio of the component (C) exceeds 55 wt %, kneading may be impossible or molding may be difficult due to a lowering in fluidity.

The polyarylene sulfide resin used in the invention is a polymer in which the repeating unit thereof is shown by the following formula:

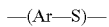

wherein Ar is an arylene group and S is sulfur.

In the invention, the polyarylene sulfide resin is a polyphenylene sulfide resin in which the arylene group is a phenylene group. Examples of the polyphenylene sulfide resin include polyphenylene sulfide resins in which the arylene group is shown by, for example, the following formulas:

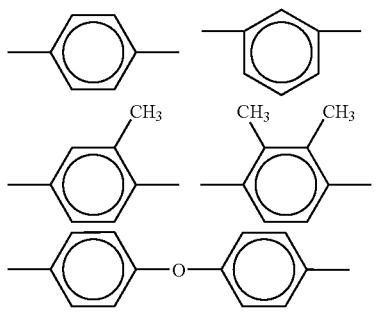

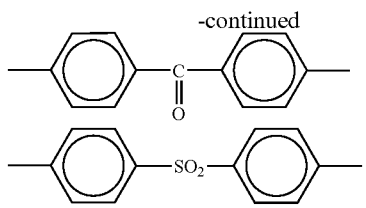

The polyphenylene sulfide resin composed of these phenylene groups may be either a homopolymer composed of the same repeating units, a copolymer composed of two or more different phenylene groups, or a mixture of these.

Insofar as the advantageous effects of the invention are not impaired, in the polyarylene sulfide resin of the invention, part of the polymer chain may be substituted by other polymers.

As the polymer for substitution, a polyamide-based polymer, a polyester-based polymer, a polyarylene ether-based polymer, a polystyrene-based polymer, a polyolefin-based polymer, a fluorine-containing polymer, a polyolefin-based elastomer, a polyamide-based elastomer, a silicone-based elastomer, or the like can be given.

The polyarylene sulfide resin of the invention can be produced by a method described in JP-B-S45-3368, JP-B-S52-12240 or the like.

The polyarylene sulfide resin of the invention may be heated in the air to increase the molecular weight thereof, or may be chemically modified using a compound such as an acid anhydride.

Hexagonal boron nitride used in the invention is a sort of artificial minerals, and mineralogically expressed as a chemical formula BN. The crystal structure is hexagonal as in the case of graphite. The hardness thereof is as low as 2 in terms of the Mohs hardness, also as in the case of graphite, which means low abrasion resistance to metals.

Hexagonal boron nitride differs in impurity content and crystallization degree depending on the production method or the like. In the invention, there are no specific restrictions on the method for producing hexagonal boron nitride. A suitable production method is a method which generates a small amount of impurities, as well as increases the crystallization degree.

The hexagonal boron nitride used in the invention is in the powder form, and the particle size thereof is not particularly limited. In respect of convenience of production, the particle size of the hexagonal boron nitride is preferably 1 μm to 200 μm, more preferably 30 μm to 60 μm.

In order to increase adhesion with the polyarylene sulfide resin and for other purposes, the surface of the hexagonal boron sulfide may be coated with silica, and further with an organic compound such as a silane coupling agent.

Within an amount range which does not impair the advantageous effects of the invention, the resin composition of the invention may contain a non-fibrous filler in addition to the hexagonal boron sulfide. Examples of the non-fibrous filler include talc, mica, kaolin, pyrophyllite, bentonite, diatomaceous earth, magnesium oxide, aluminum oxide, zinc oxide, silica, titanium oxide, calcium carbonate, magnesium carbonate, aluminum nitride, silicon carbide, glass beads, glass flake, graphite, carbon black, aluminum and copper.

The flat glass fiber used in the invention is a glass fiber having a flat cross section, and preferably has a cross-sectional oblateness of 2 to 20.

The above-mentioned cross-sectional oblateness is expressed as D2/D1 when the minor axis and the major axis of the cross section of the flat glass fiber are taken as D1 and D2, respectively, as shown in FIG. 1.

There are no specific restrictions on the fiber length of the flat glass fiber of the invention. In respect of industrial convenience, however, the fiber length is preferably 1 mm to 5 mm.

In order to increase the adhesion with the polyarylene sulfide resin or for other purposes, the flat glass fiber of the invention may be treated. As examples of the treatment, coating of the surface thereof with an organic compound, bundling a plurality of glass fibers with an organic compound or the like, can be given.

Within a range which does not impair the advantageous effects of the invention, the resin composition of the invention may contain a fibrous filler in addition to a flat glass fiber. Examples of the fibrous filler include glass fibers which are not flat glass fibers, potassium titanate whiskers, aluminum borate whiskers, aramide fibers, aluminum oxide fibers, carbon fibers and copper fibers.

The resin composition of the invention may further contain one or more resin additives (component (D)) selected from a group consisting of a mold release agent (montan acid or its metal salt, its ester, its half ester, stearyl alcohol, steramide, various bisamides, bisurea, polyethylene wax or the like), a plasticizer (octyl p-oxybenzoate, N-butylbenzene sulfonamide or the like), a fire retardant (red phosphorus, melamine cyanurate, hydroxides such as magnesium oxide and aluminum hydroxide, ammonium polyphosphate, brominated polystyrene, brominated polyphenylene ether, brominated polycarbonate, a brominated epoxy resin, a combination of these bromine-based fire retardants and antimony trioxide, or the like), an anti-oxidant (a phosphor-based, sulfur-based or phenol-based oxidant, or the like), an infrared radiation ratio improver (black silica, carbon black or the like) and a compatibilizer (an epoxy-based compound, an α-olefin-based copolymer or the like).

Preferably, the resin composition of the invention consists essentially of the above-mentioned components (A) to (D).

The amount ratio of the component (D) is 0.01 to 1 part by weight, for example, when the total weight of the components (A) to (C) is taken as 100 parts by weight.

The resin composition of the invention may contain an additive other than the component (D) in an amount range which does not impair the advantageous effects of the invention.

The resin composition of the invention is improved in voltage resistance, electric insulating properties, heat resistance, heat conductivity, fluidity and toughness in a well-balanced manner.

As the index for voltage resistance, dielectric breakdown strength can be given. The dielectric breakdown strength of the resin composition of the invention is preferably 25 kV/mm or more. The dielectric breakdown strength can be measured in accordance with ASTM D149.

As the index for electric insulating properties, arc resistance can be given. The arc resistance of the resin composition of the invention is preferably 180 seconds or more. The arc resistance can be measured in accordance with ASTM D495.

As the index for heat resistance, deflection temperature under load can be given. In respect of the use of a lead-free solder, the deflection temperature under load of the resin composition of the invention is preferably 260° C. or higher. The deflection temperature under load can be measured in accordance with ASTM D648.

As the index for heat conductivity, heat transfer coefficient can be given. In respect of radiation, the resin composition of the invention preferably has a heat transfer coefficient of 2 to 15 W/mK. The heat transfer coefficient can be measured by the hot-disc method.

As the index for fluidity, spiral flow length can be given. In respect of molding a thin-walled component, the spiral flow length of the resin composition of the invention is preferably 70 mm or more.

As the index for toughness, Izod impact strength (notched) can be given. In respect of impact by dropping or the like, the Izod impact strength (notched) of the resin composition of the invention is preferably 4 kJ/m$^2$ or more. The Izod impact strength (notched) can be measured in accordance with ASTM D256.

The method for producing the resin composition of the invention is not particularly limited. The resin composition of the invention can be produced, for example, by a known melt kneading method. Specifically, the resin composition of the invention can be produced by uniformly mixing raw materials by a mixer such as a Henckels mixer and a super floater, supplying the resulting mixture to a known melt kneader such as a single-screw or twin-screw extruder, a Banbury mixture, a kneader and a mixing roll, followed by kneading at a temperature of 280° C. to 380° C.

In the production process of the resin composition of the invention, there are no specific restrictions on the mixing order of raw materials. Specifically, the following is possible. All of the raw materials are mixed together; part of the raw materials is mixed and kneaded at first, and the rest of the raw materials is mixed and kneaded; and after part of the raw materials is blended and mixed by means of a single-screw extruder or a twin-screw extruder, the rest of the raw materials is then mixed during kneading by means of a side feeder. A component which is added in a small amount such as the component (D) may be added during the production of a molded article.

The resin composition of the invention can be molded into a molded article by using a molding method such as injection molding, press molding and extrusion molding. As the molding method, injection molding is particularly suitable.

The resin composition of the invention is a voltage-proof resin composition which is improved in voltage resistance, electric insulating properties, heat resistance, heat conductivity, fluidity and toughness in a well-balanced manner. Therefore, a molded article formed of the resin composition of the invention is suitable for use as electric and electronic components.

Specific application examples of a molded article formed of the resin composition of the invention include electric and electronic components such as a sensor, an LED lamp, an LED spacer, an insulating heat sink, a heat spreader, a cool wheel, a connector, a socket, a resister, a resistive element case, a sealing agent for a substrate, a substrate case, a relay case, a switch, a coil bobbin, a battery case, a sealing agent for a coil, a sealing agent for IGBT, a condenser, a variable condenser case, a ballast case for HID lamps, an LD light source image display unit component, an LED light source image display unit component, an optical pickup, a vibrator, various terminal boards, a transformer, a plug, a printed board, a tuner, a speaker, a small-sized motor, a magnetic head base, a power module, a semiconductor, an inverter transmission bobbin, liquid crystal, a creeping discharge insulating substrate, a motor blush holder, a fan motor bearing element and a computer-related component; household and business electric appliances such as TV components, an iron, a hair drier, a rice cooker, laundry motor components, cleaner motor components, electronic oven components, acoustic components, audio components such as compact discs, illumination components, refrigerator components, electromagnetic induction heater components, an air cleaner, a humidifier, air conditioner components and word processor components; mechanical-related components such as office computer-related components, telephone-related components, a CCD sensor housing, a CMOS sensor housing, facsimile-related components, copying machine-related components, a jig for cleaning, a motor coil bobbin and motor components; optical devices and precision machine-related components such as a digital microscope, a digital binocular, a camera and a clock; bathroom fittings such as pump components, a hot water temperature sensor and a water amount sensor; and automobile/vehicle-related components such as a valve alternator terminal, an alternator connector, an exhaust gas sensor, a cooling water sensor, a hot water temperature sensor, a throttle position sensor, an air flow meter, a brake pad wear sensor, a thermostat base for an air conditioner, a heating hot air flow control valve, a brush holder for a radiator motor, wiper motor-related parts, a distributor, a starter switch, a starter relay, an air conditioner panel switch substrate, a coil for a fuel-related electromagnetic valve, a fuse connector, a horn terminal, an insulating board for electrical equipments, a step motor rotor, a lamp socket, a lamp holder, a lamp housing, a brake piston, a solenoid bobbin, a case, a vehicle speed sensor and a cable liner.

EXAMPLES

The invention will be described in more detail by way of examples.

In the Examples and Comparative Examples, the following raw materials were used.

PPS resin: H-1G (manufactured by the DIC Corporation)

Hexagonal boron nitride: PT110 (average particle diameter, 40 μm, manufactured by Momentive's Quarts & Ceramics)

Flat glass fibers: CSG 3PA-830 (cross-sectional oblateness, 4, manufactured by Nitto Boseki Co., Ltd.)

Silica-coated aluminum nitride: FLE (average particle size, 17.4 μm, manufactured by Toyo Aluminum K.K.)

Silica-coated magnesium oxide: CF2-100B (average particle size, 25 μm, manufactured by Tateho Chemical Industries Co., Ltd.)

Talc: SP38 (average particle size, 20 μm, manufactured by Fuji Talc Industrial Co., Ltd.)

Glass fibers: 03JAFT591 (cross-sectional oblateness, 1, manufactured by Owens Corning Corporation)

Examples 1 to 4

Each of the PPS resin and the hexagonal boron nitride was weighted such that the amount ratio shown in Table 1 was attained. These raw materials were dry-blended to form a mixed raw material. Using a twin-axis kneading extruder (TEM37BS, manufactured by Toshiba Machine Co., Ltd.), the raw materials were melt-kneaded at a resin temperature of 320° C. while supplying a suitable amount of flat glass fibers such that the amount ratio shown in Table 1 was attained. The pellets obtained by melt kneading were dried at 120° C. for 3 hours by means of a hot air drier and evaluated. The results obtained are shown in Table 1.

The evaluation method of the resulting pellets is as follows.

(1) Dielectric Breakdown Strength

Using an injection molding machine (IS80EPN (80t)) (manufactured by Toshiba Machine Co., Ltd.), a 80×80×1 mm (thickness) square plate molded article formed of the resulting pellets was prepared at a resin temperature and a mold temperature shown in the table. According to ASTM D149, the dielectric breakdown strength was measured.

(2) Arc Resistance

Using an injection molding machine (IS80EPN (80t)), a 20×20×3.2 mm (thickness) square plate molded article formed of the resulting pellets was prepared at a resin temperature and a mold temperature shown in the table. According to ASTM D495, the arc resistance was measured.

(3) Deflection Temperature Under Load

Using an injection molding machine (IS80EPN (80t)), a 127×12.7×3.2 mm (thickness) bar-shaped molded article formed of the resulting pellets was prepared at a resin temperature and a mold temperature shown in the table. According to ASTM D648, the deflection temperature under load was measured under the load of 1.82 MPa.

(4) Heat Conductivity

Using an injection molding machine (IS80EPN (80t)), a 60×60×2 mm (thickness) square plate molded article formed of the resulting pellets was prepared at a resin temperature and a mold temperature shown in the table. Using a heat conductivity measuring apparatus (TPA-501, manufactured by Kyoto Electronics Manufacturing Co., Ltd.), heat conductivity was measured by the hot-disc method (slab sheet mode).

(5) Izod Impact Strength (Notched)

Using an injection molding machine (IS80EPN (80t)), a 63×12.7×3.2 mm (thickness) bar-shaped molded article formed of the resulting pellets was prepared at a resin temperature and a mold temperature shown in the table. The molded article was notched, and izod impact strength (notched) was measured in accordance with ASTM D256.

(6) Spiral Flow Length (SFL)

Using an injection molding machine (IS30EPN (30t)) and a 1 mm-thick spiral mold, the resulting pellets were injection-molded at an injection molding pressure of 98 MPa at a resin temperature and a mold temperature shown in the table, and was evaluated for flow length.

TABLE 1

|  | Unit | Example 1 | Example 2 | Example 3 | Example 4 |
|---|---|---|---|---|---|
| PPS resin | wt % | 55 | 40 | 30 | 25 |
| Hexagonal boron nitride | wt % | 15 | 20 | 30 | 45 |
| Talc | wt % |  |  |  |  |
| AlN* | wt % |  |  |  |  |
| MgO* | wt % |  |  |  |  |
| FGF* | wt % | 30 | 40 | 40 | 30 |
| GF* | wt % |  |  |  |  |
| Resin temperature | °C. | 330 | 330 | 330 | 330 |
| Mold temperature | °C. | 135 | 135 | 135 | 135 |
| Dielectric breakdown strength | kV/mm | 30 | 35 | 40 | 45 |
| Arc resistance | sec | >200 | >200 | >200 | >200 |
| Deflection temperature under load | °C. | >260 | >260 | >260 | >260 |
| Heat conductivity | W/mK | 2 | 3 | 5 | 10 |
| Izod impact strength | kJ/m² | 9.0 | 8.0 | 6.0 | 5.0 |
| SFL | mm | 300 | 150 | 120 | 80 |

AlN: Silica-coated aluminum nitride
MgO: Silica-coated magnesium oxide
FGF: Flat glass fibers
GF: Glass fibers Comparative Examples 1 to 15

In addition to the PPS resin and the hexagonal boron nitride, talc, silica-coated aluminum nitride or silica-coated magnesium oxide was weighted such that the amount ratio shown in Table 2, 3 or 4 was attained. These raw materials were dry-blended to form a mixed raw material. Using a twin-axis kneading extruder (TEM37BS, manufactured by Toshiba Machine Co., Ltd.), the raw materials were melt-kneaded at a resin temperature of 320° C. while supplying a suitable amount of flat glass fibers such that the amount ratio shown in Table 2, 3 or 4 was attained. The pellets obtained by melt kneading were dried at 120° C. for 3 hours by means of a hot air drier and evaluated. The results obtained are shown in Table 2, 3 or 4. In Comparative Examples 5 and 8, the kneading extruder was clogged with the resin composition, and hence, the evaluation could not be conducted.

TABLE 2

|  | Unit | Com. Ex. 1 | Com. Ex. 2 | Com. Ex. 3 | Com. Ex. 4 |
|---|---|---|---|---|---|
| PPS resin | wt % | 55 | 40 | 30 | 25 |
| Hexagonal boron nitride | wt % | 15 | 20 | 30 | 45 |
| Talc | wt % |  |  |  |  |
| AlN | wt % |  |  |  |  |
| MgO | wt % |  |  |  |  |
| FGF | wt % |  |  |  |  |
| GF | wt % | 30 | 40 | 40 | 30 |
| Resin temperature | °C. | 330 | 330 | 330 | 330 |
| Mold temperature | °C. | 135 | 135 | 135 | 135 |
| Dielectric breakdown strength | kV/mm | 30 | 35 | 40 | 45 |
| Arc resistance | sec | >200 | >200 | >200 | >200 |
| Deflection temperature under load | °C. | >260 | >260 | >260 | >260 |
| Heat conductivity | W/mK | 2 | 3 | 5 | 10 |
| Izod impact strength | kJ/m² | 6.2 | 5.4 | 3.8 | 3.0 |
| SFL | mm | 240 | 110 | 90 | 60 |

TABLE 3

|  | Unit | Com. Ex. 5 | Com. Ex. 6 | Com. Ex. 7 | Com. Ex. 8 | Com. Ex. 9 | Com. Ex. 10 |
|---|---|---|---|---|---|---|---|
| PPS resin | wt % | 15 | 65 | 55 | 20 | 60 | 25 |
| Hexagonal boron nitride | wt % | 45 | 15 | 5 | 60 | 30 | 15 |
| Talc | wt % |  |  |  |  |  |  |
| AlN | wt % |  |  |  |  |  |  |
| MgO | wt % |  |  |  |  |  |  |
| FGF | wt % | 40 | 20 | 40 | 20 | 10 | 60 |
| GF | wt % |  |  |  |  |  |  |
| Resin temperature | °C. | 330 | 330 | 330 | 330 | 330 | 330 |
| Mold temperature | °C. | 135 | 135 | 135 | 135 | 135 | 135 |
| Dielectric breakdown strength | kV/mm | — | 23 | 23 | — | 37 | 31 |
| Arc resistance | sec | — | >200 | >200 | — | >200 | >200 |
| Deflection temperature under load | °C. | — | >260 | >260 | — | >260 | >260 |
| Heat conductivity | W/mK | — | 1.5 | 0.9 | — | 2.9 | 3.8 |
| Izod impact strength | kJ/m² | — | 7.0 | 9.5 | — | 3.0 | 6.0 |
| SFL | mm | — | 370 | 310 | — | 280 | 65 |

TABLE 4

|  | Unit | Com. Ex. 11 | Com. Ex. 12 | Com. Ex. 13 | Com. Ex. 14 | Com. Ex. 15 |
|---|---|---|---|---|---|---|
| PPS resin | wt % | 40 | 25 | 40 | 25 | 40 |
| Hexagonal boron nitride | wt % |  |  |  |  |  |
| Talc | wt % | 20 | 45 |  |  |  |
| AlN | wt % |  |  | 20 | 45 |  |
| MgO | wt % |  |  |  |  | 20 |
| FGF | wt % | 40 | 30 | 40 | 30 | 40 |

TABLE 4-continued

|  | Unit | Com. Ex. 11 | Com. Ex. 12 | Com. Ex. 13 | Com. Ex. 14 | Com. Ex. 15 |
| --- | --- | --- | --- | --- | --- | --- |
| GF | wt % |  |  |  |  |  |
| Resin temperature | °C. | 330 | 330 | 330 | 330 | 330 |
| Mold temperature | °C. | 135 | 135 | 135 | 135 | 135 |
| Dielectric breakdown strength | kV/mm | 22 | 23 | 14 | 14 | 16 |
| Arc resistance | sec | >200 | >200 | 140 | 175 | 145 |
| Deflection temperature under load | °C. | >260 | >260 | >260 | >260 | >260 |
| Heat conductivity | W/mK | 1.5 | 3 | 0.7 | 1.8 | 0.7 |
| Izod impact strength | kJ/m² | 8.2 | 5.0 | 8.4 | 5.2 | 9.0 |
| SFL | mm | 265 | 110 | 260 | 90 | 280 |

Comparative Examples 16 to 19

The commercially available glass fiber reinforced resins shown below were dried at 120° C. for 3 hours by means of a hot air drier, and evaluated. The results obtained are shown in Table 5. None of the following commercially available glass fiber reinforced resins contains hexagonal boron nitride.

Glass fiber reinforced PPS resin: C130SC (amount of glass fibers, 30 wt %, manufactured by Idemitsu Kosan Co., Ltd.)

Glass fiber reinforced SPS resin: S931 (amount of glass fibers, 30 wt %, manufactured by Idemitsu Kosan Co., Ltd.)

Glass fiber reinforced PA66 resin: CM3004G-30 (amount of glass fibers, 30 wt %, manufactured by Toray Industries, Inc.)

Glass fiber reinforced LCP resin: E7008 (amount of glass fibers, 30 wt %, Sumitomo Chemical Co., Ltd.)

TABLE 5

|  | Unit | Com. Ex. 16 | Com. Ex. 17 | Com. Ex. 18 | Com. Ex. 19 |
| --- | --- | --- | --- | --- | --- |
| Glass fiber reinforced resin | — | PPS GF30% | SPS GF30% | PA66 GF30% | LCP GF30% |
| Model | — | C130SC | S931 | CM3004G-30 | E7008 |
| Resin temperature | °C. | 320 | 290 | 290 | 280 |
| Mold temperature | °C. | 135 | 150 | 125 | 90 |
| Dielectric breakdown strength | kV/mm | 22 | 35 | 38 | 35 |
| Arc resistance | sec | 120 | 90 | >200 | 125 |
| Deflection temperature under load | °C. | >260 | 235 | 250 | 240 |
| Heat conductivity | W/mK | 0.6 | 0.6 | 0.6 | 0.6 |
| Izod impact strength | kJ/m² | 6.5 | 6.0 | 9.6 | 5.7 |
| SFL | mm | 180 | 180 | 160 | 300 |

INDUSTRIAL APPLICABILITY

The resin composition of the invention is improved in voltage resistance, electric insulating properties, heat resistance, heat conductivity, fluidity and toughness in a well-balanced manner. Therefore, the resin composition of the invention can be preferably used as a material for various electric and electronic components.

The invention claimed is:

1. A resin composition consisting essentially of the following components (A) to (D):
   (A) a polyphenylene sulfide resin: 20 wt %<component (A)≦60 wt %;
   (B) a powdered hexagonal boron nitride having a particle size of 30 μm to 200 μm: 8 wt %≦component (B)≦55 wt %;
   (C) a flat glass fiber having a cross sectional oblateness of 2 to 20: 15 wt %≦component (C)≦55 wt %; and
   (D) one or more resin additives selected from the group consisting of a mold release agent, a fire retardant, an anti-oxidant, an infrared radiation ratio improver, and a compatibilizer, where polyamide and polyphenylene ether are excluded,
   wherein the amount of components (A) to (C) is a weight percentage relative to the total amount of the components (A) to (C).

2. The resin composition according to claim 1, which has a dielectric breakdown strength of 25 kV/mm or more.

3. The resin composition according to claim 1, which has an arc resistance of 180 seconds or more.

4. The resin composition according to claim 1, which has a heat conductivity of 2 to 15 W/mK.

5. A molded article which is obtained by injection-molding the resin composition according to claim 1.

6. A voltage-proof component comprising the molded article according to claim 5.

7. The resin composition according to claim 1, wherein:
   (A): 23 wt %<component (A)≦57 wt %;
   (B): 8 wt %≦component (B)≦50 wt %; and
   (C): 20 wt %≦component (C)≦45 wt %.

8. The resin composition according to claim 1, wherein:
   the composition has a dielectric breakdown strength of 25 kV/mm or more;
   the composition has an arc resistance of 180 seconds or more; and
   the composition has a heat conductivity of 2 to 15 W/mK.

9. The resin composition according to claim 1, wherein the powdered hexagonal boron nitride has a particle size of 30 μm to 60 μm.

* * * * *